United States Patent Office 3,143,474
Patented Aug. 4, 1964

3,143,474
PREPARATION OF DUCK-EMBRYO MODIFIED INFECTIOUS CANINE HEPATITIS VIRUS VACCINE
Ernest J. Froelich, Albany, N.Y., assignor to Sterling Drug Inc., New York, N.Y., a corporation of Delaware
No Drawing. Filed July 30, 1962, Ser. No. 213,118
12 Claims. (Cl. 167—78)

This invention relates to a vaccine for immunizing dogs against infectious canine hepatitis and to its preparation. In particular, it relates to an infectious canine hepatitis vaccine comprising an apathogenic, avirulent, living, duck-embryo modified, infectious canine hepatitis virus, to a process for the preparation of this vaccine, and, to a process for the preparation of said virus.

A particularly preferred embodiment of the vaccine is a bivalent vaccine for simultaneously immunizing dogs against infectious canine hepatitis (hereinafter designated ICH) and canine distemper (hereinafter designated CD) comprising said duck-embryo modified ICH virus and a living, chick-embryo modified, CD virus.

ICH, an acute febrile disease of dogs, was first identified as recently as 1948. Clinically similar to non-complicated CD, it is considered to be the second most prevalent infectious disease of dogs. Because of its prevalence and extremely contagious character, it was necessary to develop safe and effective immunizing agents to provide protection against this widespread and infectious disease.

Up to the present time, of the various types of ICH vaccines that have been developed, only two have been offered commercially for the immunization of dogs against this disease: one, a vaccine containing a formalin-killed virus derived from tissues of puppies infected with virulent virus; and, the other, a vaccine containing modified living virus propagated in animal kidney tissue cultures. Both of these vaccines have shortcomings. The vaccine with the killed virus is safe, but immunity develops very slowly and lasts no longer than about five to six months. The vaccine with the live virus produces a long-lasting immunity, but its safety is questionable. Many dogs injected with the live tissue culture vaccine shed the virus in urine and may become carriers of the disease. Puppies especially are highly susceptible to infection in this manner and sometimes develop severe reactions, very often complicated with transient or even permanent opacification of one or both eyes because of the invasion of the virus into the corneal epithelial cells.

I have now succeeded in developing a new attenuated or modified strain of ICH virus that is apathogenic, avirulent and immunogenic. Further, it is suitable for use not only in a monovalent vaccine against ICH, but also in combination with modified CD virus as a bivalent vaccine against ICH and CD or in combination with other pathogenic agents, e.g., suitable inactivated cultures of Leptospirae, Streptococci, Salmonellae, Brucellae, etc., to provide immunizing agents with polyvalent antigenic properties.

I prepared the new modified strain of ICH virus by multiple serial passages of an originally virulent and pathogenic strain through ferrets and embryonated duck eggs. My new modified strain has been identified by virus neutralization tests in tissue culture, by simultaneous virus-antiserum inoculation of dogs' eyes and by protection tests against challenge with two strains of virulent ICH virus in dogs. It differs from pathogenic strains in that it produces no ill-effects in susceptible puppies; it does not have invasive properties; it does not produce pathologic tissue changes; and, it is not excreted in the urine of vaccinated animals. Thus, as a result of multiple passages through embryonated duck eggs, the virus has lost its pathogenic and virulent characteristics but has retained its immunogenicity.

Susceptible dogs injected with my new vaccine containing said duck-embryo modified ICH virus showed excellent immune response with regard to both antibody production and resistance to severe challenge with virulent ICH virus. Further, the duck-embryo strain of virus was not transmitted from vaccinated dogs to susceptible littermate controls kept together in intimate contact for a prolonged period of time.

I prepared, as a preferred embodiment, a bivalent vaccine containing said duck-embryo modified ICH virus and a living, chick-embryo modified, CD virus. Susceptible dogs vaccinated with the combined vaccine demonstrated no ill-effects and were solidly protected against challenge with virulent ICH and CD viruses. The two antigenic components of the vaccine were found to stimulate antibody production independently and without interfering with each other. No "crowding-out" effect in antibody production or development of immunity was observed following administration of the vaccine to puppies which were immune to CD or ICH.

In my process for attenuating pathogenic and virulent ICH virus to produce an apathogenic, avirulent and immunogenic ICH virus, I was able to effect partial attenuation by serially passing said pathogenic and virulent ICH virus through ferrets a plurality of times. Partial attenuation was effected after about 24 to 57 passages.

Complete attenuation to produce an apathogenic, avirulent and immunogenic ICH virus was effected by serially passing the partially modified virus obtained by multiple passage in ferrets through duck embryos a plurality of times sufficient to produce avirulence. The number of passages was preferably not less than about 37. There is no upper limit on the number of passages although, in practice, no more than 49 were used. In practicing the process of my invention, I preferably used 10-day embryonated duck eggs and found that propagation was best achieved by intra-amniotic inoculation.

In the preparation of the ICH vaccine, the inoculated embryonated duck eggs were incubated for about seven days at about 35° C., harvested and homogenized under refrigeration. The duck-embryo homogenate containing apathogenic, avirulent, living, duck-embryo modified, ICH virus was mixed with an aqueous stabilizing menstruum and stored under refrigeration and, subsequently, freeze-dried under vacuum.

The bivalent ICH–CD vaccine of my invention was prepared by mixing well a duck embryo homogenate containing said apathogenic, avirulent, living, duck-embryo modified, infectious canine hepatitis virus and a chick embryo homogenate containing living, chick-embryo modified, canine distemper virus with an aqueous stabilizing menstruum. The resulting vaccine was preferably stored under refrigeration and, subsequently, freeze-dried under vacuum.

By duck embryo homogenate I means to include the decapitated duck embryo with its amniotic membrane. By chick embryo homogenate I mean to include the decapitated chick embryo, the chorioallantoic membrane and the allantoic fluid.

The following examples will illustrate specific embodiments of my invention without, however, restricting it thereto.

Virus Modification Procedure

*Seed virus.*—The starting material was virulent ICH virus, Cornell strain, 10 percent dog liver suspension. Prior to inoculation of ferrets, the virus was injected into susceptible puppies in order to confirm its pathogenicity and to obtain a freshly isolated seed virus. The puppies developed typical symptoms of ICH with fever and pronounced leukopenia and died 7 to 8 days after infection. The necropsy findings were characteristic of acute ICH. A portion of the liver from one of the puppies was removed aseptically, homogenized, diluted 1:10 with 10 percent serum-saline, and stored in sealed ampules at −60° C. This frozen material was used as the seed virus in studies designed to develop a live modified strain of virus suitable for immunization of dogs.

*Partial attenuation by passages in ferrets.*—During an extensive search for an experimental animal which could be employed for the modification of ICH virus, it was found that ferrets, although naturally refractory to the disease, can be infected with ICH virus. Intraocular injection of the virus produces progressive interstitial keratitis and ophthalmia resulting in irreversible loss of vision without any other clinical symptoms. Based on this experience, serial passages of the ICH seed virus were carried out in ferrets using the intraocular route of inoculation and the suspension of the infected eye as the passage material.

Prior to inoculation, the ferrets were anethetized with sodium pentobarbital. In passage $F_1$, 0.02 ml. of ICH seed virus (10 percent liver supernatant) was inoculated into the anterior chamber of one eye. Corneal opacification was noticeable on the third day and the eye became totally opaque on the sixth day. The animal was sacrified on the seventh day. The infected and the non-infected eyes were enucleated, ground separately in a mortar with Alundum, and from each was prepared a 10 percent tissue suspension, using as diluent 10 percent serium-saline with 200 units/ml. penicillin and 200 mcg./ml. streptomycin.

Subsequent passages were made by inoculating one eye with 0.01 to 0.015 ml. of a 10 percent suspension of the opaque eye from the previous passage, and the opposite eye with a 10 percent suspension of the non-infected, clear eye (control). A total of 27 weekly passages were carried out in this manner. In all instances, the infected eye exhibited characteristic opacity which started several days after inoculation, while the control eye remained unaffected and clear. The inoculations had no apparent effect on the general health of the animals.

During the first phase of 27 intraocular passages of ICH virus in ferrets, two passages ($F_{10}$ and $F_{24}$) were inoculated into hepatitis-susceptible puppies to determine whether or not modification of virulence was achieved.

One puppy injected intraocularly (I.O.) with $ICHF_{10}$ showed progressive opacification of the cornea, followed by leukopenia and clinical symptoms of hepatitis, and died eight days after injection. The post-mortem findings were indistinguishable from those following infection with virulent ICH virus.

Another susceptible puppy was injected I.O. with 0.02 ml. of $ICHF_{24}$. This animal developed keratitis of the injected eye, but otherwise remained in good health. Fourteen days later, this puppy together with a littermate control, were challenged with virulent ICH virus. The control developed hepatitis and succumbed, and the injected puppy was immune to challenge. It appeared from this experiment that some modification of the viral characteristics took place after 24 serial passages in the ferret.

At the $F_{27}$ passage level it was possible to isolate the virus from the spleen of a ferret which had been inoculated by the I.O. route. This indicated that the ferret-passaged virus had acquired invasive characteristics for the ferret. The general health of this animal, as well as others in further passages of the virus, did not appear to be affected. Several of the animals exhibited no febrile reaction and their blood picture remained essentially normal.

Further eye to eye passages were continued at weekly intervals for a total of 57 passages. Evidence of further modification of ICH virus was obtained following inoculation of the ferret-adapted strain at the 30th, 31st, 35th and 40th passage levels into dogs.

In each instance two or more hepatitis-susceptible puppies were injected with virus-laden tissues recovered from ferrets. The puppies were carefully observed and their temperatures and white blood cell (WBC) counts were taken daily until challenge, and again for two weeks after challenge. As a rule littermate puppies were used as infection controls in all experiments. Additional studies, comprising urine cultures for possible isolation of the virus and serum neutralization tests in tissue culture to determine antibody levels, were conducted in two such experiments.

All puppies inoculated with ferret-adapted ICH virus of the above mentioned passage levels demonstrated only slight reactions attributable to the virus and all resisted challenge with virulent ICH virus. The control animals showed symptoms of infection (fever and leukopenia) but gradually recovered. Several of the vacinated dogs exhibited a drop in WBC and a transient febrile reaction lasting 3 to 6 days. Shedding of the virus in the urine was demonstrated in 1 of 3 dogs injected with $ICHF_{31}$ and 2 of 4 dogs injected with $ICHF_{40}$. Due to the relatively mild course of the disease in the controls, it was felt that the virus was partially modified and further passages in the ferret were continued until passage $F_{57}$. At this point the passages in the ferret were discontinued and a search for a more effective procedure began.

*Attempted attenuation by passages in tissue culture.*—Following numerous attempts to propagate virulent as well as ferret-adapted ICH virus in other hosts known to be refractory to the infection (mice, hamsters, guinea pigs, rabbits and embryonated chicken eggs), a new series of passages of the $ICHF_{57}$ virus was initiated in monolayer cultures of dog kidney cells and minced chick embryo tissues. The purpose of this work was first to establish growth of the virus in dog kidney cells and then gradually to adapt the virus to chick embryonic tissue, which was mixed with the dog kidney cells in increasing proportions.

A total of six passages was carried out in monolayer cultures of dog kidney cells using $ICHF_{57}$ as the initial inoculum. The inoculum was a 20 percent eye suspension prepared in Hanks' balanced salt solution with the addition of lactalbumin hydrolysate, tryptose phosphate broth and bovine amniotic fluid. The cytopathic changes produced by the ferret-adapted strain of ICH virus were similar to those produced by virulent ICH virus but developed more slowly. The identity of the virus was confirmed by serum neutralization tests in tissue culture.

Additional passages of $ICHF_{57}TC_6$ were made in tissue cultures consisting of mixed dog kidney and chick embryo cells. The virus was carried through a total of 16 passages in tissue culture. No detectable growth was observed in the absence of dog kidney cells. Since there was no evidence that the virus actually multiplied in minced chick embryo tissue, further attempts or tissue culture adaptation were discontinued.

Modification studies of ICH virus were resumed in embryonated duck eggs.

*Complete attenuation by passages in embryonated duck eggs.*—Exploratory research of the duck embyro as a host for the propagation and modification of ICH virus demonstrated that it was possible both to grow and to modify the virus in this host. Successful propagation of the virus was best achieved following intra-amniotic inoculation. All passages were conducted in 10-day old embryonated duck eggs.

The initial inoculum consisted of whole tissue culture suspension of $ICHF_{57}TC_{16}$. Six eggs were each inoculated with 0.1 ml. of the tissue culture material into the amniotic sac. Following seven days incubation at 35° C., the embryos and amniotic fluid were harvested, homogenized, and diluted 1:2 with phosphate buffered saline solution. Subsequent passages were carried out in embryonated duck eggs using 50% tissue suspensions as passage inocula. Titrations of the virus at various passage levels were made in monolayer cultures of dog kidney cells. Examination of the embryos at 7, 10 and 14 days after inoculation of the virus did not reveal any gross pathologic changes, indicating that the infection had no apparent effect on embryonic development.

The material harvested from duck embryo passage No. 5 ($ICHF_{57}TC_{16}DE_5$, from now on referred to as $ICHDE_5$) was investigated with respect to viral titer and pathogenicity for dogs, and its identity was determined by serum neutralization tests in tissue culture. The titer of ICH virus, determined in dog kidney tissue culture was $10^{-4}$. Immune ICH serum completely neutralized the cytopathic effects of the virus, while normal dog serum showed no neutralizing effect. This proved that the duck embryo-passed virus is ICH virus. Pathogenicity studies were conducted in a litter of four susceptible puppies. Two of the puppies were injected subcutaneously (S.C.) with 2 ml. doses of $ICHDE_5$ 5 percent embryo suspension, one iwth the same dose intravenously (I.V.), and the fourth with 0.5 ml. intracerebrally (I.C.) and 0.02 ml. intraocularly (I.O.). Both puppies injected S.C. remained normal, except for a one day rise in temperature and a transient drop in WBC count. The puppy injected I.V. exhibited a febrile reaction and leukopenia, and diffuse keratitis of the injected eye. The fourth puppy injected I.C. and I.O. developed symptoms of acute encephalitis, accompanied by fever, leukopenia and "blue eye," and it died on the 20th day of infection. Necropsy revealed pathologic changes of ICH. Urinalyses for ICH virus were positive in all four animals. This study indicated that $ICHDE_5$ was pathogenic for dogs, although only mild reactions were observed upon S.C. injection.

In subsequent passages which were made at weekly intervals, the titer of virus increased progressively until it stabilized between $10^{-6}$ and $10^{-7}$ from the 13th passage on. Beginning with $ICHDE_{29}$ the harvested material (embryo+amnion) was diluted $10^{-4}$ or $10^{-5}$ before being passed to the next group of duck eggs. This reduced the viral titer of the harvested tissues by approximately one log in the next two passages. From then on the titer was again stabilized at around $10^{-6}$ or $10^{-7}$.

Passages of ICH virus in embryonated duck eggs were continued until the 49th passage level. Representative samples of each passage were stored at $-60°$ C. All harvests of embryonic tissues after passage 41 were prepared as suspensions in a stabilizing menstruum containing casein hydrolysate, sucrose and buffered saline, as described in U.S. Patent 2,912,361.

Extensive studies were carried out with many passage levels of the duck embryo-adapted virus to determine its characteristics upon inoculation into susceptible puppies. Partial attenuation was observed for the first time with $ICHDE_{29}$. Of the six puppies injected with this virus, only one developed a transient febrile reaction and leukopenia lasting three days, and all resisted challenge with virulent ICH "street" virus. No untoward reactions were seen in puppies following injection of the duck embryo adapted virus at the 37th, 41st, 48th and 49th passage levels. From the outcome of these studies it was concluded that ICH virus following 37 or more serial passages in embryonated duck eggs lost its ability to produce illness in the vaccinated host, but fully retained its immunizing properties. Puppies vaccinated with the modified strain remained in good health, developed high levels of serum antibodies and resisted challenge with virulent ICH virus which produced illness and/or death of non-vaccinated littermate controls.

*Identity of the Duck-Embryo Modified Virus*

The duck-embryo modified strain of ICH virus was identified by serum neutralization tests in dog kidney tissue culture, by simultaneous virus-antiserum inoculation into dog's eyes, and by protection tests in hepatitis-susceptible puppies following challenge with two strains of virulent ICH virus.

Following are examples of tests which prove that the duck-embryo modified virus is a variant antigenically closely related or identical to virulent virus causing ICH in dogs.

(*a*) *Serum neutralization test in tissue culture.*—$ICHDE_{47}$ was diluted and mixed with equal parts of hepatitis antiserum prepared from one dog which had been hyperimmunized with the Cornell strain and from another dog hyperimmunized with another virulent strain of ICH virus isolated from laboratory puppies. The final mixtures contained $10^5$ virus particles per ml. and serum dilutions $10^{-1}$, $10^{-2}$, $10^{-3}$ and $10^{-4}$. Normal dog serum free of ICH antibodies served as a control. The virus-serum mixtures were incubated at 36° C. for one hour, whereupon they were inoculated into tubes of dog kidney tissue culture. The final results were read following seven days' incubation of the tubes at 36° C. It was thus found that the duck-embryo modified virus was neutralized by both immune sera at dilutions $10^{-1}$, $10^{-2}$ and $10^{-3}$, while the normal dog serum showed no evidence of neutralizing effect.

(*b*) *Intraocular injection of virus-serum mixtures.*—Two littermate puppies, found to be susceptible to ICH by serum neutralization test, were respectively inoculated into the left eye of each with a mixture of the duck embryo virus $ICHDE_{48}$ and a homologous ICH antiserum prepared from ICH virus "Cornell," and, with a mixture of the same virus and an ICH antiserum prepared from another virulent strain of ICH virus. The opposite eye of each was inoculated with a similar mixture containing $ICHDE_{48}$ and normal dog serum. Prior to inoculation, the mixtures were stored at 36° C. for 2 hours. Both dogs developed characteristic diffuse opacification of the cornea of the right eye and no visible changes of the left eye.

(*c*) *Protection test in puppies.*—As described below under various potency tests in dogs, the duck-embryo modified strain of ICH virus protected susceptible dogs against infection with virulent hepatitis virus.

*Comparison of Virulence and Pathogenicity of the Original Seed Virus, the Partially Modified Virus, and the Truly Modified Vaccine Strain*

The virulence and pathogenicity of the ICH virus at three stages of modification were studied in littermate mongrel puppies, 12 to 18 weeks of age. Only puppies free of ICH antibodies, as determined by serum neutralization tests in dog kidney cultures, were employed.

(*a*) *The original seed virus.*—The original seed virus which was employed as the starting passage material and which was finally converted into a fixed apathogenic variant was virulent ICH virus, Cornell strain. The following experiment illustrates its pathogenic properties for dogs.

Three littermate puppies were inoculated with the virulent virus in form of supernatant from a 20 percent liver suspension. Puppy No. 1 received 1.5 ml. intraperitoneally, and puppies Nos. 2 and 3 each 0.015 ml. intraocularly under sodium pentobarbital anesthesia. Body temperatures and WBC counts were taken starting one day prior to infection until the end of the experiment. The puppies were observed daily and any symptoms observed were recorded. All three animals developed an acute fulminating infection and died within 4 to 6 days after infection.

Gross pathological findings at necropsy were similar in all three animals, except that there were no eye changes in dog No. 1. The pathological changes are listed briefly as follows: blood poorly clotted, general hemorrhagic lymphadenitis, tonsillitis, petechial hemorrhages in thymus, lungs, mesntery and omentum, liver mottled, gall bladder edematous, hemorrhagic serous exudate in pleural and abdominal cavities, non-coagulated blood in stomach and small intestines. Microscopic examination of impression smears from the liver showed intranuclear inclusion bodies characteristic of infectious hepatitis.

(*b*) *The partially modified virus.*—Partial modification was first observed following inoculation of puppies with the 29th passage of ICH virus in embryonated duck eggs. The experiment comprised one litter of 4 puppies 15 weeks old and one litter of 4 puppies 13 weeks old. All animals were found to be devoid of ICH virus antibody. Three puppies in each litter were injected S.C. with 2.0 ml. of ICHDE$_{29}$, 20 percent tissue suspension. Fourteen days later, all vaccinated puppies, including two non-vaccinated littermates (one from each litter) were challenged intravenously with virulent ICH virus "Cornell," 2.0 ml. 10 percent liver suspension. Temperatures and WBC counts were taken daily starting three days before vaccination and continuing until 10 days after challenge. Urine was collected from all vaccinated animals on the 14th day of vaccination to find out whether virus is shed through the kidneys. This was done by inoculating the urine samples into triplicate tubes of dog kidney tissue culture and examining the tubes for cytopathology following one week incubation at 36° C.

It was found that only one of the puppies exhibited any reactions attributable to the inoculated duck-embryo passaged virus. This one puppy appeared well but showed a transient febrile reaction and a drop in the WBC count. When challenged with virulent ICH virus, all puppies showed solid immunity. In contrast, both non-vaccinated control animals developed illness and succumbed to infection. Viruria was demonstrated in three out of six vaccinated dogs.

(c) *The truly modified vaccine strain.*—Although the safety of the modified vaccine strain of ICH virus has been confirmed in many experiments, the following severe test in dogs is further proof of its safety in susceptible puppies.

One litter of four puppies was divided into two groups of two. The first two animals were injected I.V. each with 1,000,000 TCID$_{50}$ of ICHDE$_{41}$ and the other two animals each with 1,000,000 TCID$_{50}$ of a virulent strain of ICH virus. Temperatures and WBC counts were recorded daily from the day of injection until 14 days thereafter or until death.

Both puppies injected with virulent virus developed a peracute, fulminating disease and died four days after infection. Post-morten examination revealed pathologic changes characteristic of infectious canine hepatitis. The two puppies inoculated with the same large dose of the modified vaccine strain of virus (ICHDE$_{41}$) remained in perfect health and survived. Their temperature and WBC counts were within normal range throughout the experiment. The animals were sacrificed two weeks after injection. Post-mortem examination revealed no gross pathologic changes and histological examination of liver, spleen and kidneys demonstrated no abnormalities. Impression smears of the livers were stained with Giemsa's stain, but no inclusion bodies could be found.

Another experiment which equally illustrates the avirulent and apathogenic properties of the modified strain of virus, as compared to its virulent counterpart, consisted of clinical and pathological studies of dogs following intraocular injection of the two strains of ICH virus.

Six susceptible puppies from two litters were divided into three groups of two and inoculated as follows:

| Dog No. | Inoculum |
|---|---|
| 32,187 | 0.21 ml. of ICHDE$_{49}$, 2.5% tissue susp. |
| 32,188 | Do. |
| 32,189 | 0.02 ml. of ICHDE$_{49}$, 10% tissue susp. |
| 32,190 | Do. |
| 32,304 | 0.02 ml. of ICH "Cornell," 10% dog liver susp. |
| 32,305 | Do. |

All injections were made into the anterior chamber of the eye following I.V. anesthesia with sodium pentobarbital. The animals were kept under close observation for one month, and body temperatures and WBC counts were taken for 14 days after injection. At the end of the experiment, the animals were sacrified, a necropsy was performed, and their tissues were examined histologically.

All dogs injected with the modified vaccine strain of virus had developed corneal opacity of the injected eyes after four days. The corneae of the opposite eyes remained clear. At the end of the experiment some clearing of the keratitis was noted in 3 out of 4 animals. The body temperatures and WBC counts of these puppies were normal throughout the test, and no signs of illness were seen.

The two puppies injected I.O. with the virulent strain of ICH virus demonstrated complete opacification of the injected eye on the third day. Both became ill on the fourth day. They stopped eating, became progressively weaker and died, one on the fifth and the other on the seventh day after inoculation. Post-mortem examination revealed pathological changes of acute systemic hepatitis, similar to those seen after S.C. or I.V. injection of virulent virus.

The necropsy findings in the four puppies injected with the modified strain of virus were negative for gross pathological changes. Histological examination of sections from liver, spleen and kidney showed no microscopic changes attributable to the virus.

*Response of Susceptible Puppies to Injection of Duck-Embryo Modified Strain of ICH Virus*

An experiment was conducted in hepatitis-susceptible littermate puppies to determine their clinical and immunological response to I.M. administration of the modified vaccine strain if ICH virus. Attempts were also made to isolate the virus from the blood and various tissues in order to gain some knowledge about the fate of the virus upon parenteral injection.

Eight mongrel puppies belonging to one litter, found to be suceptible to ICH (serum neutralizing titers <1:10), were kept in an isolated room and six of them were injected I.M. with single 2.0 ml. doses of a 2.5% suspension of ICHDE$_{49}$ in an aqueous casein hydrolysate-sucrose solution. The animals were carefully observed, their body temperatures and WBC counts were taken once daily, and sterile specimens of blood and urine were collected twice weekly. The blood and urine specimens were cultured in dog kidney tissue cultures for possible isolation of virus. Two puppies were sacrificed 9 days after vaccination, two vaccinated and one control after 14 days, and two vaccinated dogs and one control after 21 days. Necropsies were performed on all animals and sections of tissues were removed for histopathology. In addition, pieces of liver and kidney from each dog were collected aseptically and cultured in tissue culture for presence of virus. Prior to sacrifice, serum samples were obtained for subsequent neutralization assays in dog kidney tissue culture. The latter were to provide data of immune response.

*Results:*—All vaccinated puppies, as well as the two non-vaccinated controls, showed normal appearance and behavior during the entire test period. None of the animals had febrile reactions and there were no changes in the total WBC counts. Gross pathologic changes at necropsy were very much the same in the six vaccinated dogs and in the two non-vaccinated controls. They consisted of disseminated subpleural hemorrhages and white scar-like lesions with occasional petechiae in the kidneys and the liver. Microscopic examinations of the tissues from all dogs, including the controls, revealed pathologic lesions attributable to a heavy infestation of migrating helminth larvae. Actual segments of the larvae were visible in well-defined granulomatous lesions in the cortical zone of kidneys. None of the animals exhibited any gross or microscopic changes attributable to ICH.

The results of tissue culture cultivation of blood were negative, i.e., no virus could be isolated from any dog at any time. The urines, liver and kidney suspensions were toxic to the cells and the results could not be interpreted. Viral neutralization tests of sera in tissue culture demonstrated the following antibody titers ($SN_{50}$, calculated by Reed and Muench):

| Dog. No. | Before Vaccination | 9 Days After Vac. | 14 Days After Vac. | 21 Days After Vac. |
|---|---|---|---|---|
| 30,614 | <1:10 | 1:300 | | |
| 30,616 | <1:10 | 1:300 | | |
| 30,609 | <1:10 | | 1:300 | |
| 30,611 | <1:10 | | 1:300 | |
| 30,610 | <1:10 | | | 1:300 |
| 30,612 | <1:10 | | | 1:300 |
| 30,613 | <1:10 | | | <1:10 |
| 30,615 | <1:10 | | | <1:10 |

As evidenced by these data, the duck-embryo modified strain of ICH virus proved to be apathogenic and avirulent for susceptible puppies. Presence of antibody titers in the serum stimulated production of specific antibodies. Absence of antibodies in the littermate controls kept in the same room with the vaccinated puppies indicates that transmission of virus did not take place.

*Immune Response of Puppies to Various Doses of the Modified Vaccine Strain of Virus ($ICHE_{41}$)*

The purpose of this investigation was to determine the immunizing potency of various doses of the duck-embryo modified ICH virus against challenge with virulent virus.

Three litters of puppies 15 weeks old, found to be susceptible to hepatitis by the serum neutralization test in dog kidney tissue culture, were divided into four uniform groups and injected S.C. as follows:

| Dog No. | Litter | Inoculum |
|---|---|---|
| 25,001 | I | 2.0 ml. of $ICHDE_{41}$ 10% susp. |
| 25,008 | II | Do. |
| 25,012 | III | Do. |
| 25,013 | III | Do. |
| 25,002 | I | 2.0 ml. of $ICHDE_{41}$ 5% susp. |
| 25,003 | I | Do. |
| 25,009 | II | Do. |
| 25,014 | III | Do. |
| 25,004 | I | 2.0 ml. of $ICHDE_{41}$ 1% susp. |
| 25,005 | I | Do. |
| 25,010 | II | Do. |
| 25,015 | III | Do. |
| 25,016 | III | Do. |
| 25,006 | I | Non-vaccinated Control. |
| 25,011 | II | Do. |
| 25,017 | III | Do. |

It was calculated that three groups of puppies received approximately $2 \times 10^6$, $1 \times 10^6$ and $2 \times 10^5$ $TCID_{50}$ virus, respectively.

The animals were housed in individual cages in an isolation room. Temperatures and WBC counts were taken daily starting 3 days before vaccination and continuing until 10 days after challenge. Urine and serum specimens were collected at 7, 14 and 21 days after vaccination. The urines were inoculated into dog kindey tissue cultures for possible detection of virus in the urine. The inactivated sera were tested for ICH antibody levels by neutralization tests in tissue culture.

Three weeks after vaccination all puppies, including one non-vaccinated control from each litter, were challenged with a virulent ICH virus isolated from an infected puppy, 1.0 ml. of 10% liver suspension intravenously. The test was terminated ten days following challenge.

*Results:*—All vaccinated puppies appeared to be in good health from the time of vaccination until challenge and from the time of challenge until the end of the experiment. Irrespective of the dose of vaccine given, body temperatures and WBC counts remained unaffected. When challenged with virulent "street virus'" three weeks after vaccination, all vaccinated puppies showed solid immunity. In contrast, all three littermate controls developed symptoms of hepatitis with fever and leukopenia; one died 4 days after infection and the other two gradually recovered. Both surviving controls developed interstitial keratitis of both eyes which had not cleared by the end of the test. All of the vaccinated and challenged puppies showed no pathological changes of the eyes or any other organs. All dog kidney tissue cultures inoculated with urine specimens of the puppies at 7, 14, and 21 days after vaccination showed no cytopathic changes, indicating that no virus was shed in the urine. Cytopathic changes were present in tissue cultures inoculated with the urine which was collected from the two surviving control animals seven days following challenge.

It was evident from this experiment that the duck-embryo modified strain of ICH virus produces no ill-effects when inoculated into susceptible puppies even at high doses. In spite of modification, the virus has retained its immunogenic properties and protected puppies against challenge with virulent ICH virus.

*Study of Transmission of the Modified ICH Virus From Vaccinated Puppies to Non-Vaccinated Contact Controls*

It was indicated in earlier studies that hepatitis susceptible puppies vaccinated with the duck-embryo modified strain of ICH virus develop immunity without noticeable ill-effects and without shedding the virus in the urine. In order to confirm these data under more rigorous conditions, a test was performed to determine whether the virus can be transmitted from vaccinated puppies to susceptible littermate controls during prolonged intimate contact.

Two litters of ICH-susceptible mongrel puppies, one consisting of six and the other of four, were kept on the floor in an isolation room. The aminals ate and drank from a common container and were constantly exposed to each other. Prior to vaccination, temperatures and WBC counts were taken for four consecutive days, and individual sera and urine specimens were collected immediately before vaccination. Three puppies in the first litter and two puppies in the second liter were then injected intramuscularly (I.M.) each with 2.0 ml. of the vaccine virus $ICHDE_{49}$ 2.5% duck embryo tissue suspension. The remaining three puppies in the first litter and two puppies in the second litter were left unvaccinated to serve as contact controls.

The animals were kept under close observation for eight weeks. During this period they were checked daily for appearance and behavior, and temperatures and WBC counts were taken daily for the first two weeks after vaccination. Urine samples were collected by catheterization thrice weekly from the five vaccinated dogs for a period of two weeks and thereafter once on the 4th, 6th, and 8th week following vaccination. These urine samples were tested subsequently for possible presence of virus following concentration by inoculation of the concentrates into tubes of dog kidney tissue culture. Serum specimens were collected from all 10 puppies immediately before vaccination and on the 2nd, 4th, 6th and 8th weeks after vaccination. The sera were inactivated by heating in a water bath at 56° C. for 30 minutes prior to use in serum neutralization tests in tissue culture. The purpose of these tests were to determine whether non-vaccinated puppies acquired neutralizing antibodies as the result of contact exposure with vaccinated puppies and, at the same time, determine the levels of serum antibodies in the vaccinated animals.

The results of the test are summarized as follows:

All vaccinated and non-vaccinated animals appeared normal and ate well throughout the 8 weeks' observation period. The temperatures of both groups of puppies were essentially normal. Several of the puppies had relatively high WBC counts, but this seemed to be unrelated to vaccination.

At no time after vaccination was it possible to detect presence of ICH virus in the urine of vaccinated or non-vaccinated animals.

All vaccinated puppies were found to develop significant levels of virus-neutralizing serum antibodies, while all contact controls remained negative throughout the eight weeks of intimate cohabitation with their vaccinated littermates.

Judging by the outcome of this experiment, the duck-embryo modified strain of ICH virus is not excreted in the urine of vaccinated dogs and it is not transmitted by contact to other hepatitis-susceptible dogs. From this point of view, the duck-embryo virus behaves quite differently from various tissue-culture modified strains of virus which are shed through the kidneys and can be passed on to susceptible puppies.

*Preparation of Bivalent CD-ICH Vaccine*

Three experimental laboratory batches of the bivalent vaccine were prepared according to procedures described below. In each case the bivalent vaccine was prepared by combining a living, chick-embryo modified strain of canine distemper (CD) virus with the above-described duck-embryo modified strain of infectious canine hepatitis (ICH) virus. The diluent for the harvested tissues was a solution of casein hydrolysate and sucrose which had been found to be an excellent stabilizing menstruum for CD virus (U.S. Patent No. 2,912,361).

*Seed viruses.*—CD virus, modified live virus, chick embryo origin, strain Onderstepoort, was maintained as a homongenized suspension of infected C.A. membranes in sealed ampules at −60° C. Prior to use for vaccine preparation, the virus was passed once or twice through embryonated hens' eggs to build up the titer.

ICH virus, modified live virus, duck embryo origin was maintained as a 50% embryo suspension under the same condition as CD virus. All experimental lots of vaccine were prepared from seed virus $ICHDE_{47}$ or $ICHDE_{48}$.

*Preparation of individual virus pools.*—Six to seven day old embryonated hens' eggs were inoculated via the C.A.M. with CD seed virus. Following 6 to 7 days' incubation at 35° C., the eggs were examined by transillumination and the infected tissues were harvested. A 66% w/v. suspension of the virus-laden tissues was prepared by homogenizing the material under refrigeration. Thereupon the suspension was tested for sterility and quick-frozen.

Ten-day old embryonated duck eggs were employed for the inoculation with ICH virus. The diluted seed virus was inoculated into the amniotic sac and the eggs were incubated for 7 days at 35° C. After the end of the incubation period, the embryos and amniotic sacs were harvested, homogenized in a chilled blending apparatus, and diluted with the stabilizing menstruum. Following gauze filtration and sterility testing, the suspension was stored in a freezer.

Titration tests for CD and ICH virus were carried out to determine the viral content of each virus pool.

*Preparing the bivalent vaccine.*—Following the outcome of sterility and titration tests, appropriate volumes of the two virus pools were combined and mixed well. The final concentrations of CD and ICH viruses in terms of tissue were 33% and 2.5%, respectively. Two ml. quantities of the combined vaccine were then dispensed in vials or ampuls, the contents were freeze-dried and the containers sealed under vacuum. The final vaccine was stored in a refrigerator at 4° C.

*Stability of the Bivalent Vaccine*

The stability of CD and ICH viruses in the bivalent vaccine was tested following storage of the freeze-dried product at freezing (−25° C.), refrigeration (+4° C.) and incubation (+37° C.) temperatures.

The CD virus content of the vaccine was determined by inoculating serial dilutions of the reconstituted vaccine onto the C.A.M. of embryonated hens' eggs and examining the membranes after 7 days' incubation at 35° C. A minimum of five eggs was used per vaccine dilution, and the viral titers were expressed as 50% infectivity endpoints ($EID_{50}$), calculated by Reed and Muench.

The ICH virus content of the vaccine was determined by inoculating serial tenfold dilutions of the reconstituted vaccine into multiple tubes of dog kidney tissue culture. The tubes were incubated for seven days at 35° C. and examined for cytopathic changes. The viral titers were expressed as 50 percent infectivity endpoints ($TCID_{50}$), calculated by Reed nad Muench.

Following are stability data of an experimental lot of vaccine. All figures represent $ID_{50}$ titers per 1.0 ml. of vaccine, expressed as reciprocal logs.

| Storage Condition | Viral Titer ($ID_{50}$) | |
|---|---|---|
| | CD | ICH |
| Freshly prepared | 4.05 | 3.9 |
| 4 days at 4° C | 3.85 | 4.1 |
| 4 days at 37° C | 3.34 | 3.4 |
| 8 days at 4° C | 5.05 | 3.83 |
| 8 days at 37° C | 3.82 | |
| 12 days at 37° C | 3.05 | 3.0 |
| 16 days at 37° C | 2.47 | 2.9 |
| 7 weeks at −25° C | 4.77 | 3.85 |
| 6 months at 4° C | 4.14 | 3.72 |
| 6 months at 37° C | 0 | <1.4 |
| 6 months at −25° C | 3.95 | 4.0 |
| 2 yrs. at 4° C | 3.5 | 4.74 |

*Immunogenic Effects of the Bivalent Vaccine as Compared to its Single Components*

(Study of "Interference")

Whenever two antigens are combined in a vaccine, the question arises whether or not each of the two vaccine components is able to stimulate antibody production without interfering with each other. To clarify this important point, two exepriments were carried out: one, in dogs to measure immune response in terms of levels of serum antibodies; and, the other, in ferrets to measure resistance to challenge with virulent CD virus.

(a) *Experiments in dogs.*—Sixteen mongrel puppies, 10 to 13 weeks old, from four litters were divided into four uniform groups. The puppies were kept in strict isolation for two weeks prior to the experiment during which time they were bled and their sera tested for CD and ICH antibodies. All were found to be free of antibodies against both diseases.

The first group of four animals was injected S.C. with 2.0 ml. of CD vaccine (33% chick embryo suspension from passage $CDCE_{38}$), the second with 2.0 ml. of ICH vaccine (2.5% duck embryo suspension from passage $ICHDE_{48}$), and the third group with the bivalent CD–ICH vaccine containing the same concentrations of each of the virus suspensions as the single vaccines ($CDCE_{38}$ 33% +$ICHDE_{48}$ 2.5%). The fourth group of four puppies remained uninoculated and served as controls.

The animals were kept under close observation for a total of five weeks. Body temperatures and WBC counts were taken daily starting six days before vaccination and continuing until the end of the test. The animals were bled immediately before vaccination and again one, two and three weeks thereafter. The inactivated sera were subsequently tested for CD antibodies in embryonated hens' eggs and for ICH antibodies in dog kidney tissue culture by means of serum neutralization. In order to find out whether ICH virus was shed in the urine of animals vaccinated with either the ICH vaccine alone or the ICH–CD combined vaccine, urine samples were collected by catheterization three weeks after vaccination and again two weeks after challenge.

All twelve vaccinated dogs, including four non-vaccinated controls were challenged with virulent ICH virus (1.0 ml. ICH virus isolated from an infected puppy, 10% dog liver, I.V.) three weeks after vaccination. The challenge was to provide information whether the dogs injected with the bivalent vaccine would be as resistant to infection as those receiving ICH vaccine alone.

*Results.*—All dogs injected with the combination vaccine developed serum antibodies against both antigens. The levels of CD antibodies at various intervals after vaccination were similar to those following injection of the CD vaccine alone, and also the levels of ICH antibodies after the injection of the bivalent vaccine were similar to those following injection of ICH vaccine alone.

None of the vaccinated dogs exhibited any ill-effects or reactions attributable to vaccination with either of the single vaccines or the combined vaccine. The temperatures and WBC counts were within normal limits from the time of vaccination until the time of challenge. Thereafter only those puppies not immune to challenge developed febrile reaction and leukopenia characteristic of infectious canine hepatitis.

Analyses of urine specimens collected from the animals 3 weeks after vaccination and two weeks after challenge with ICH virus showed the following: Viable ICH virus was not detected in urine specimens of any dog which had been vaccinated with the bivalent vaccine or ICH vaccine aolne. Only two dogs were found to shed ICH virus in the urine: the first was vaccinated with CD vaccine alone and ICH virus was isolated from a urine sample collected two weeks after hepatitis challenge; the second dog was a control and the virus was recovered from the urine also two weeks following infection.

When challenged with hepatitis "street" virus 3 weeks after vaccination, the following observations were made: All four control dogs developed characteristic symptoms of ICH; two died on the 4th day, one on the 6th day, and the fourth dog gradually recovered. All controls exhibited fever, anorexia and pronounced leukopenia. Of the four dogs vaccinated with CD vaccine alone, two died on the 4th day of challenge, one on the 6th day and one became ill but recovered. Post-mortem examinations of the dead animals revealed pathological changes of acute fulminating ICH infection. The group of dogs vaccinated with ICH vaccine and the combined CD–ICH vaccine demonstrated solid immunity. None of the dogs in these two groups showed any ill-effects; they appeared normal and their temperature and WBC counts were within normal range.

The surviving animals were sacrificed two weeks after challenge and necropsied. There were no gross or histopathological changes visible in any dogs except two which had clinically recovered from the illness brought about by challenge. The changes affected most of the lymph nodes, the kidneys and the liver. Impression smears from the livers of all animals were stained by Giemsa's method and examined for hepatitis inclusions. Intranuclear inclusion bodies were found only in those dogs which had shown clinical reactions to challenge (all dogs in the first and last groups) while none were found in the other two groups of dogs.

It may be concluded from this experiment that the immune response of the dogs vaccinated with the CD–ICH bivalent vaccine was as good against both antigens as that of dogs vaccinated with either single vaccine against their respective antigens.

These findings were confirmed in the next experiment.

(*b*) *Experiment in ferrets.*—The purpose of this study was to determine the minimal immunizing dose of the bivalent vaccine and its CD component against virulent challenege with CD virus.

The two vaccines used were the same as those employed in the previous test in dogs. Each of the vaccines was reconstituted and diluted in tenfold serial dilutions ranging from $10^{-1}$ to $10^{-4}$. Immediately thereafter, groups of two ferrets were injected S.C. with single 1.0 ml. doses of the undiluted vaccine and each of the dilutions thereof. Three weeks later, all 20 vaccinated ferrets, including four non-vaccinated controls, were infected with CD virus (1.0 ml. of CD virus "Lederle," 10% ferret spleen, S.C.).

It was found that CD vaccine alone protected all ferrets at serial tenfold dilutions up to $10^{-4}$ while the minimal immunizing concentration of the bivalent vaccine was $10^{-3}$. This difference may not be significant due to the possibility that the titer of CD virus in the combined vaccine might have been somewhat lower than in the CD vaccine.

The preceding two experiments show that the two antigens comprising the bivalent vaccine stimulate antibody production quite independently and without interfering with each other. This has been demonstrated both by antibody levels and upon challenge of the animals with virulent CD and ICH viruses.

*Study of "Crowding-Out" Effect After Vaccination of Dogs With Bivalent CD-ICH Vaccine*

A further test of interference to study "crowding-out" effect was undertaken. The purpose of this experiment was to discover whether dogs possessing antibody to one of the bivalent vaccine were capable of normal immune response to the other component. The lack of such ability has been described as the "crowding-out" effect. In order to find out whether one type of antibody "crowds out" the other type following injection of the combined CD-ICH vaccine, the experiment was designed as follows:

Three litters of puppies were selected for the study. The first litter consisted of seven puppies found to be free of CD and ICH antibodies. The second comprised four puppies which had high levels of CD antibodies but lacked antibodies against ICH. The third litter consisted of six puppies which had antibodies against ICH but not against CD. The litters were selected on the basis of serum neutralization tests for CD antibodies in embryonated hens' eggs and for ICH antibodies in dog kidney tissue culture. Also included in the test was another litter of four puppies void of ICH antibodies which served as a control of infection with virulent ICH virus.

All 17 puppies (the controls excepted) were injected with my bivalent CD-ICH vaccine prepared from CD virus "Onderstepoort," CE passage 35 (33%) and ICH virus duck-embryo modified vaccine strain, DE passage 49 (2.5%). Each dog received 2.0 ml. of reconstituted vaccine by the I.M. route.

The animals were bled for serum immediately before administration of the vaccine and again three weeks after vaccination. The sera were inactivated at 56° C. for 30 minutes and used in neutralization tests for assay of antibody titers. CD antibody titers were determined in serum neutralization tests in chick embryos and ICH antibody titers in similar tests in dog kidney tissue culture.

Body temperatures and WBC counts were obtained during three days preceding challenge and during seven days after challenge. The animals were observed daily throughout the test for possible ill-effects or reactions.

Three weeks after vaccination and shortly after the blood withdrawals for serum testing, all 17 vaccinated dogs, including four non-vaccinated controls, were challenged with virulent ICH virus (1.0 ml. ICH virus "Cornell," 10% liver susp., I.V.). The test was terminated three weeks after challenge.

*Results.*—No "crowding-out" of either CD or ICH antibodies was observed. Dogs immune to hepatitis, as well as dogs immune to distemper, developed high levels of protective antibodies against both diseases following injection of the dual vaccine. The antibody titers in each case were similar to those in distemper and hepatitis susceptible animals. It is interesting to note that the injection of bivalent vaccine in every animal provided a "booster" effect for the already existing antibody titers. Thus, for example, the average distemper log antibody titer was increased from 3.75 to 4.85, and the average hepatitis antibody titer from 2.55 to 2.86.

It was also found that all dogs acquired complete protection against a severe challenge with virulent ICH virus which killed four out of four control dogs. This supplies further proof that dogs immune to either virus infection developed excellent protection against challenge, similar to that developed in dogs which were originally free of antibodies against both infections.

I claim:

1. A vaccine for immunizing dogs against infectious canine hepatitis comprising an apathogenic, avirulent living, duck-embryo modified, infectious canine hepatitis virus.

2. A vaccine for simultaneously immunizing dogs against infectious canine hepatitis and canine distemper comprising an apathogenic, avirulent, living, duck-embryo modified, infectious canine hepatitis virus and a living, chick-embryo modified. canine distemper virus.

3. A process for the preparation of a vaccine for immunizing dogs against infectious canine hepatitis which comprises mixing a duck embryo homogenate containing apathogenic, avirulent, living, duck-embryo modified, infectious canine hepatitis virus with an aqueous stabilizing menstruum.

4. A process according to claim 3 in which the vaccine is freeze-dried under vacuum.

5. A process for the preparation of a vaccine for simultaneously immunizing dogs against infectious canine hepatitis and canine distemper which comprises mixing well a duck embryo homogenate containing apathogenic, avirulent, living, duck-embryo modified, infectious canine hepatitis virus and a chick embryo homogenate containing living, chick-embryo modified, canine distemper virus with an aqueous stabilizing menstruum.

6. A process according to claim 5 in which the vaccine is freeze-dried under vacuum.

7. A process according to claim 5 in which the final concentrations of infectious canine hepatitis and canine distemper viruses in terms of tissue are about 2.5% and 33%, respectively.

8. In a process for attenuating pathogenic and virulent infectious canine hepatitis (ICH) virus to produce an apathogenic, avirulent and immunogenic ICH virus, the step which comprises serially passing said pathogenic and virulent ICH virus through duck embryos a plurality of times.

9. A process according to claim 8 in which the number of passages is not less than about 37.

10. A process according to claim 8 in which 10-day old embryonated duck eggs are used.

11. A process according to claim 8 in which propagation is achieved by intra-amniotic inoculation.

12. In a process for attenuating pathogenic and virulent infectious canine hepatitis (ICH) virus to produce an apathogenic, avirulent and immunogenic ICH virus, the steps which comprise serially passing said pathogenic and virulent ICH virus successively through ferrets a plurality of times and through duck embryos a plurality of times.

References Cited in the file of this patent

Miles et al.: "Cultivation of Canine Hepatitis Virus in Embryonated Hen's Eggs, and its Subsequent Transmission to Dogs," Nature, vol. 168, No. 4277, pp. 699–700 (1951).

Lucam et al.: "Hen's Egg Culture of the Virus of Fox Encephalitis Adapted to the Ferret," Compt. Rend., Acad. Sci., vol. 233, No. 3, pp. 277–279 (1951).

Lucam et al.: "Egg Culture of Distemper Virus and of Dog Hepatitis Virus," Bull. Acad. Vet., France, vol. 26, No. 1, pp. 67–72 (1953).

Cabasso et al.: "Propagation of Infectious Canine Hepatitis Virus in Tissue Culture," Proc. Soc. Exp. Biol. and Med., vol. 85, No. 2, pp. 239–245 (1954).

Fieldsteel et al.: "Cultivation and Modification of Infectious Canine Hepatitis Virus in Roller Tube Cultures of Dog Kidney," Proc. Soc. Exp. Biol. and Med., vol. 86, No. 4, pp. 819–823 (1954).

Emery et al.: "Propagation of Infectious Canine Hepatitis Virus in Porcine Kidney Tissue Culture," Science, vol. 127, pp. 148 (1958).

Kapsenberg: "Relationship of Infectious Canine Hepatitis Virus to Human Adenovirus," Proc. Soc. Exp. Biol. and Med., vol. 101, pp. 611–614 (1959).

UNITED STATES PATENT OFFICE
CERTIFICATE OF CORRECTION

Patent No. 3,143,474                      August 4, 1964

Ernest J. Froelich

It is hereby certified that error appears in the above numbered patent requiring correction and that the said Letters Patent should read as corrected below.

Column 2, line 57, for "means" read -- mean --; column 3, line 21, for "anethetized" read -- anesthetized --; line 30, for "serium-saline" read -- serum-saline --; column 3, line 75, and column 4, line 1, for "pupplies" read -- puppies --; column 4, line 16, for "vacinated" read -- vaccinated --; column 5, line 18, for "iwth" read -- with --; column 6, line 69, for "mesntery" read -- mesentery --; column 7, line 43, for "Post-morten" read -- Post-mortem --; column 7, in the table, under the heading "Inoculum", first line thereof, for "0.21" read -- 0.02 --; same table, under same heading, lines 1, 3 and 5 thereof, for "a/c", each occurrence, read -- % --; column 8, line 32, for "if" read -- of --; line 37, for "suceptible" read -- susceptible --; column 10, line 39, for "liter" read -- litter --; line 61, for "were" read -- was --; column 12, line 9, for "nad" read -- and --; column 13, line 21, for "aolne" read -- alone --; line 73, after "with" insert -- virulent --; column 14, line 18, after "one" insert -- component --; column 15, line 13, for "modified." read -- modified, --.

Signed and sealed this 9th day of March 1965.

(SEAL)
Attest:

ERNEST W. SWIDER                      EDWARD J. BRENNER
Attesting Officer                   Commissioner of Patents